United States Patent [19]
Reif

[11] Patent Number: 5,862,987
[45] Date of Patent: Jan. 26, 1999

[54] NON-METALLIC SPRAY NOZZLE MANIFOLD AND SUPPORT THEREFOR

[75] Inventor: Stephen C. Reif, Naperville, Ill.

[73] Assignee: Spraying Systems Co., Wheaton, Ill.

[21] Appl. No.: 844,301

[22] Filed: Apr. 18, 1997

[51] Int. Cl.$^6$ ........................................ B05B 15/06
[52] U.S. Cl. .................... 239/209; 239/450; 239/550; 239/566; 239/600; 248/58
[58] Field of Search ........................ 239/200, 207, 239/208, 209, 450, 566, 548, 600, 550; 285/64; 403/331, 336, 381; 138/106, 107; 248/343, 58

[56] References Cited

U.S. PATENT DOCUMENTS

| | | | |
|---|---|---|---|
| 3,831,681 | 8/1974 | Livingston | 239/209 |
| 4,753,196 | 6/1988 | Lack et al. | 248/58 |
| 4,834,186 | 5/1989 | Ballard | 239/209 |
| 5,097,798 | 3/1992 | Little | 248/58 |
| 5,230,302 | 7/1993 | Steudler, Jr. | 248/58 |
| 5,651,502 | 7/1997 | Edwards | 239/450 |

*Primary Examiner*—Andres Kashnikow
*Assistant Examiner*—Lisa Ann Douglas
*Attorney, Agent, or Firm*—Leydig, Voit & Mayer, Ltd.

[57] ABSTRACT

A header fabricated of a lightweight non-metallic material includes a pair of opposed ears which are adapted for sliding mated engagement within a channel support. The header includes reinforced ribs which present relatively planar surfaces with spaced openings that accommodate a plurality of spray nozzles.

24 Claims, 2 Drawing Sheets

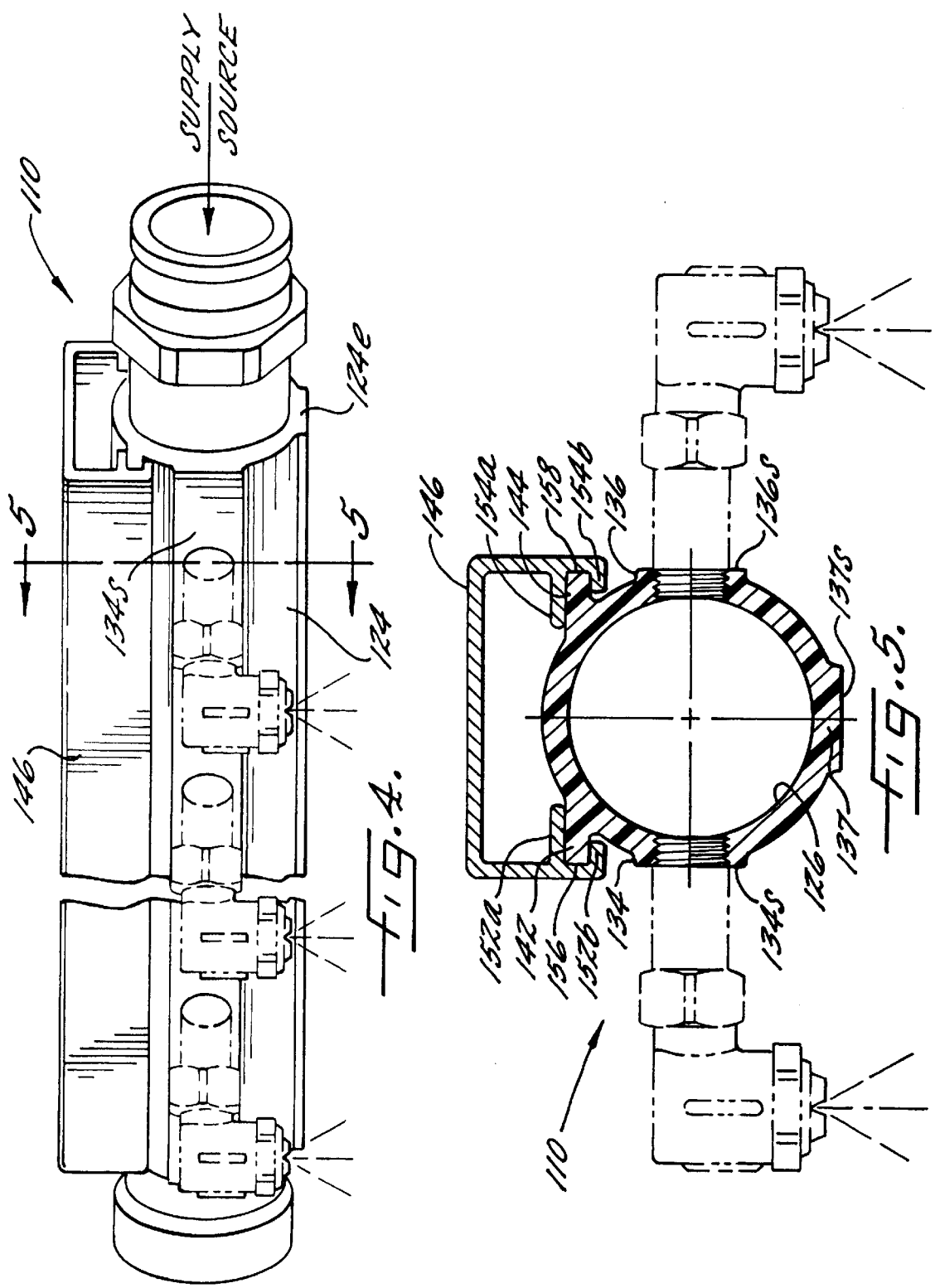

5,862,987

NON-METALLIC SPRAY NOZZLE MANIFOLD AND SUPPORT THEREFOR

FIELD OF THE INVENTION

The present invention relates generally to liquid manifolds and headers, and particularly, to manifolds and headers which support and communicate liquid to a plurality of spray nozzles supported thereon.

BACKGROUND OF THE INVENTION

In many industrial, agricultural, and commercial fluid spraying applications, it is necessary for a plurality of spray nozzles to be mounted in a longitudinal array. It is common to support such a plurality of spray nozzles along the length of an elongated manifold pipe, commonly known as a header, and to communicate liquid from a supply source through the manifold to the plurality of nozzles. Such manifolds typically are formed from stainless steel pipe, and by virtue of their long length, can be heavy and difficult to handle, assembly, and support. While it is often desirable that the manifold have a relatively large diameter, both to enable large volume liquid passage and to facilitate nozzle attachment and internal threading and axial coupling of components thereon, increasing the diameter of the header further increases the weight and difficulty in handling. Thus, it is often difficult to implement large diameter manifolds in known fluid spraying systems.

OBJECTS AND SUMMARY OF THE INVENTION

It is an object of the present invention to provide a light-weight manifold or header adapted for easy handling and reliable support of a plurality of spray nozzles.

Another object is to provide a header as characterized above with a relatively simple and reliable mounting arrangement.

A further object is to provide a manifold which is adapted to facilitate accurate forming of transverse mounting and flow passageways.

Yet another object is to provide a manifold of the foregoing type which may be made larger in diameter than standard pipe to facilitate formation of internal threads or sockets for axially supported components of a liquid spraying system.

The present invention achieves these and other additional objects with a header or manifold disposed to transport fluid to a plurality of spray nozzles. The header comprises a generally tubular header body of a non-metallic, relatively lightweight material that provides an inner cylindrical bore through which the fluid is transported. One or more longitudinally extending ribs are disposed on the outer periphery of the header body and each present a relatively planar surface. As an example, a pair of opposed longitudinally extending ribs may be utilized to provide opposed relatively planar surfaces. This construction readily accommodates transverse mounting and flow passageways which are connected with the spray nozzles and adds structural support for the header. In addition, at least one pair of outwardly extending ears are disposed on the header body and are adapted for sliding engagement into a horizontal support. Other features and advantages are described below.

BRIEF DESCRIPTION OF THE DRAWINGS

FIG. 4 is an isometric view of a header according to a further embodiment of the invention; and FIG. 5 is a cross-section view taken along the lines 5—5 of FIG. 4.

DETAILED DESCRIPTION OF THE PREFERRED EMBODIMENTS

Generally, the present invention relates to a manifold or header which supports and supplies fluid to a plurality of spaced spray nozzles in a liquid spray system. The header is of a relatively lightweight construction and includes one or more longitudinally extending flanges which provide planar surfaces for installation of the spray nozzles.

Figure 1:
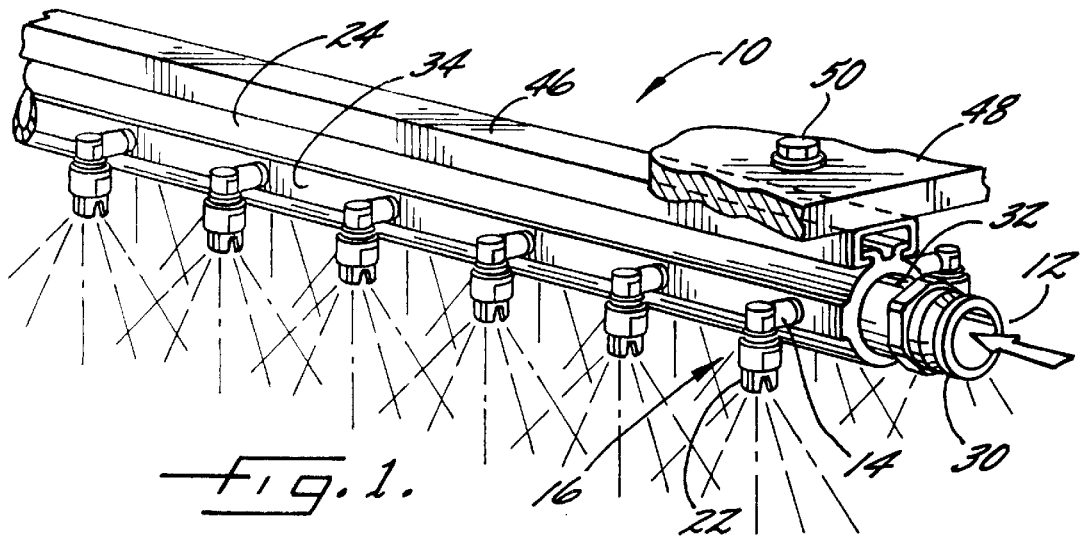
FIG. 1 is an isometric view of a lightweight header according to the present invention.

FIG. 1 illustrates a longitudinally extending header or manifold 10 according to the present invention. The header 10 is adapted to receive fluid from a supply source in a direction denoted by an arrow 12 and transfer the fluid to a plurality of transverse fluid passageways such as passageway 14. The transverse passageways are located at predetermined spaced intervals along the length of the header 10. The transverse passageways each support spaced spray nozzle assemblies such as nozzle assembly 16, a cross section of which is shown in phantom FIG. 3. In the described embodiment, the nozzles 16 are each of a conventional type that are adapted to apply a liquid spray to a desired area. It will be understood by those skilled in the art that such mounting of spray nozzles can be utilized in various installations, such as stationary industrial spraying systems and the like.

The illustrated nozzle assemblies such as nozzle assembly 16 include a downwardly oriented generally cylindrical body portion 18 that includes a bore formed on its peripheral side adapted to receive the transverse passageway 14. A cap portion 20 is sized to interfit with the body portion and receive a nozzle spray tip 22 at one of its ends. It will be appreciated that pressurized fluid introduced into the header 10 may supply fluid to a plurality of such interconnected nozzle assemblies 16, with the fluid passing through the transverse passageway 14 associated with each nozzle assembly and downwardly through the vertically depending body portion 18 for discharge through the nozzle spray tip 22.

Figure 3:
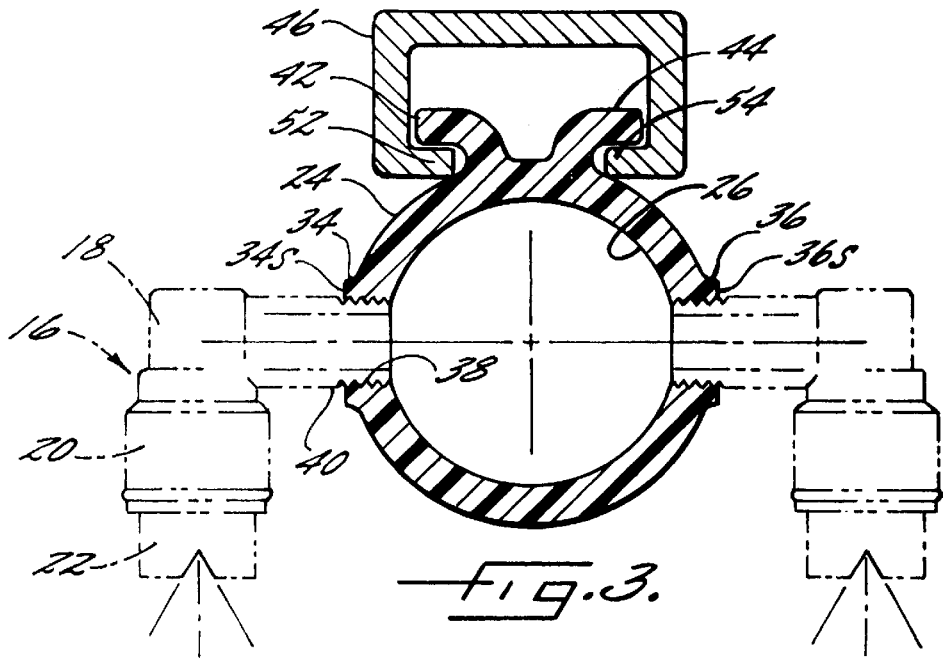
FIG. 3 is a cross-section view taken along the lines 3—3 of FIG. 2.

In accordance with the invention, the header 10 comprises a longitudinally extending manifold or header body 24 that defines a generally tubular inner wall 26 (FIG. 3). The header body 24 is fabricated of a relatively lightweight, non-metallic material. For example, a plastic extruded material such as a polypropylene may be utilized. In addition, the diameter of the inner wall 26 is preferably selected to be greater than that of conventional metal pipe now used for spraying application headers. This construction advantageously permits easy servicing and installation of the header 10. The material utilized further offers resistance to corrosive attack and even premature failure due to the handling of various chemicals or cleaning solutions which may be sprayed.

Figure 2:
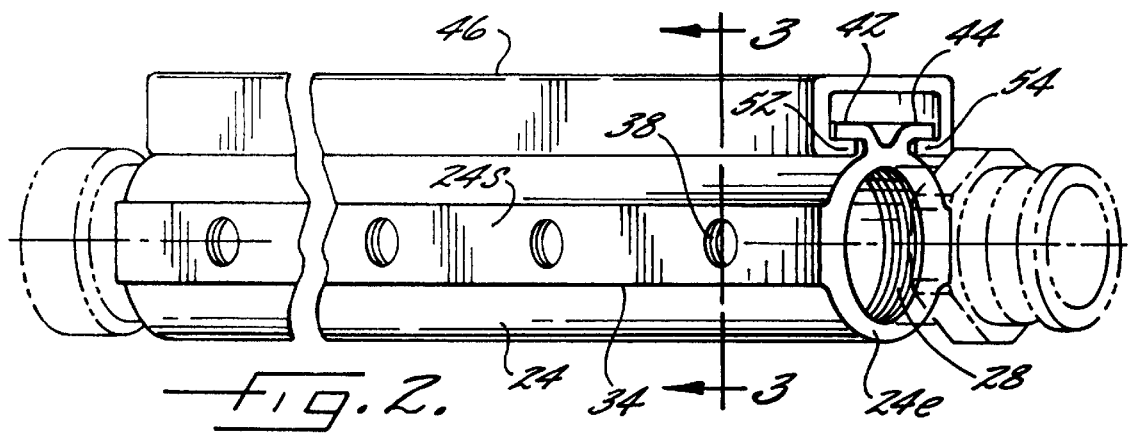
FIG. 2 is another isometric view of the header of FIG. 1 shown without a plurality of spray nozzles.

For connecting the header body to further components of a spraying system, means are disposed at the ends of the header body for enabling ready connection of other components to the header. That is, internal threads such as threads 28 shown in FIG. 2 may be readily formed in the internal wall at a header body end 24e. This avoids complicated machining operations to be performed on the exterior of the header body in order to provide connection for upstream components with the header. Alternatively, a suitable socket arrangement such as the socket assembly 30 shown in FIG. 1 may include an outwardly extending conduit 32 that is glued within the header body end 24e. Thus, the increased diameter of header body 10 as compared to prior constructions further enables reduced fabrication and installation costs.

In accordance with a feature of the invention, one or more flanges are formed on the outer peripheral surface of the header body. Each of the flanges presents a relatively planar surface to enable ready installation and removal of the nozzle assemblies supported by the header. By way of example, flanges may be formed opposite to each other on the outer surface of the header body that are adapted to present exposed, relatively planar side surfaces. In addition to providing a surface for ready attachment of the nozzle assemblies, the flanges provide structural support for the header. In the described embodiment, the header includes opposed ribs or flanges 34, 36 extending outwardly along the length of the header body 24 to form lateral sides thereof. For connecting the nozzle assemblies, the ribs 34, 36 present a relatively planar opposed side surfaces 34s, 36s. This facilitates machining operations to the header body and securement of the nozzle assemblies or other components to the lateral sides of the header.

A plurality of spaced openings such as opening 38 are formed in the ribs at predetermined locations along the length of the header body. The openings such as opening 38 are each sized to receive a plurality of nozzle assemblies such as nozzle assembly 16. In this regard, the opening may include threads such as threads 40 in order to facilitate connection of the transverse passageways associated with the plurality of nozzles.

For facilitating support of the header, mating means are provided which enable ready securement of the header to a horizontal support. In one embodiment, the header body 24 includes a pair of opposed ears 42, 44 which are integrally formed with and extend outwardly from the outer peripheral surface of the header body 24. The header 10 is supported by a longitudinally extending metal channel support 46 having a generally C-shaped cross section. The channel support 46 may be attached to a ceiling or surface 48 with the use of screws such as the screw 50 shown in FIG. 1 or other suitable connecting means. The channel support 46 includes complementary flanges 52, 54 which form a channel that receives the ears 42, 44 in mated engagement when the header 10 is slidingly engaged with the channel support 46.

In another embodiment of the invention, a header body 124 is adapted to be slidingly received within a longitudinally extending channel support 146. In this embodiment, a pair of outwardly facing ears 142, 144 integrally formed in the header body 124 extend along the length of the body 124. In this embodiment, the channel support 146 is generally C-shaped, but it provides opposed spaced pairs of flanges 152a–b, 154a–b that each define opposed longitudinally extending grooves 156, 158. The opposed ears 142, 144 are sandwiched between the respective pairs of flanges 152a–b, 154a–b to secure the header 110 in place.

As with the embodiment described above, the header body 124 is fabricated of a non-metallic material such as extruded plastic and includes a pair of opposed ribs 134, 136 which provide relatively flat side surfaces 134s, 136s for ready access by a plurality of nozzle assemblies. In addition, the body provides a generally cylindrical inner surface 126 that is preferably larger than conventional designs. This arrangement permits the ends of the header such as end 124e to be a female connection for other components of the spraying system.

While the invention has been described thus far with respect to embodiments having flanges located opposite each other and spaced about 180 degrees from each other, the flanges may be provided in any orientation on the outer peripheral surface of the header body. For example, the header body 124 shown in FIGS. 4 and 5 includes a flange or rib 137 extending along the length of the header body 124 and formed on the underside thereof. The flange 137 includes a relatively flat surface 137s which provides a further location for attachment of spray nozzle assemblies. By way of example, in-line or straight-through type nozzle assemblies may be located at spaced locations along the flange 137. Those skilled in the art will appreciate that flanges may alternatively be disposed at other orientations depending on the desired alignment and application of the spray nozzle assemblies being utilized. For example, the header may be fabricated such that each of a pair of flanges are offset approximately 45 degrees from the orientation of the flanges 34, 36 shown in FIGS. 1 through 3 such that they provide somewhat downwardly facing surfaces. Other flange orientations may be utilized as desired.

Accordingly, a header meeting the aforestated objectives has been described. The header supplies fluid to a plurality of spaced apart nozzles in a relatively lightweight construction. This is accomplished with a tubular structure having opposed ribs that extend longitudinally from the lateral sides of the header body. In addition, the header body includes opposed ears that adapted to be received within a channel support. While the invention is susceptible of various modifications and alternative constructions, certain illustrative embodiments thereof have been shown and described above. It should be understood by those skilled in the art, however, that various modifications and alternative constructions and equivalents may be made without departing from the spirit and scope of the invention which is defined by the appended claims.

What is claimed is:

1. A header for transporting fluid to a plurality of spray nozzles in a spraying system comprising a tubular header body of generally cylindrical form made of a non-metallic material, said body having an inner cylindrical bore through which the fluid is directed, said body having at least one integrally formed portion on the outer periphery thereof that defines a planar surface parallel to the axis of the cylindrical bore for defining a mounting surface for said spray nozzles, and said body being formed with a plurality of longitudinally spaced passageways extending through said mounting surface transversely to the axis of the cylindrical bore for communicating fluid from said cylindrical bore to spray nozzles mounted on said mounting surface.

2. The invention as in claim 1 in which said integrally formed portion is in the form of a reinforcing flange.

3. The invention as in claim 1 in which said body is formed with two of said integrally formed portions which each define a respective planar nozzle mounting surface formed with a plurality of longitudinally spaced transverse passageways communicating with the cylindrical bore of said header.

4. The invention as in claim 3 in which said integrally formed portions are disposed on diametrically opposed external sides of said header body.

5. The invention as in claim 1 in which said integrally formed portion is disposed on an underside of said header body.

6. The invention as in claim 1 in which said header body has a pair of integrally formed outwardly extending ears for enabling said header to be suspended from an overhead support.

7. The invention as in claim 1 in which said body includes a pair of said integrally formed portions on opposite sides thereof and a third such integrally formed portion on an underside thereof, each defining a respective planar nozzle mounting surface extending parallel to the longitudinal axis of the cylindrical bore.

8. The invention as in claim 1 wherein the header body has an end that defines a female connector adapted for receiving another component of the spraying system.

9. The invention as in claim 1 wherein the header body is made of extruded plastic.

10. The invention as in claim 1 in which said transverse nozzle body passageways each are internally threaded for receiving an externally threaded end of a nozzle.

11. A header for transporting fluid to a plurality of spray nozzles in a spraying system comprising a tubular header body of generally cylindrical form made of a non-metallic material, said body having an inner bore through which the fluid is directed, said cylindrical body having at least one integrally formed enlarged wall section for reinforcing the body and for defining an external relatively flat, longitudinally extending nozzle mounting surface parallel to the axis of said cylindrical bore, and said body being formed with a plurality of longitudinally spaced transverse passageways extending through said flat mounting surface for communicating fluid from said cylindrical bore to nozzles mounted on said planar mounting surface.

12. The invention as in claim 11 in which said body is formed with two said enlarged wall sections which each define a respective planar nozzle mounting surface formed with a plurality of longitudinally spaced transverse passageways communicating with the cylindrical bore of said header.

13. The invention as in claim 12 in which said enlarged wall sections are disposed on diametrically opposed external sides of said header body.

14. The invention as in claim 11 in which said enlarged wall section is disposed on an underside of said header body.

15. A header for transporting fluid to a plurality of spray nozzles in a spraying system comprising a tubular header body of generally cylindrical form made of a non-metallic material, said body having an inner cylindrical bore through which the fluid is directed, and said body being formed with a plurality of longitudinally spaced passageways extending through said body transversely to the axis of the cylindrical bore for communicating fluid from said cylindrical bore to spray nozzles mounted on said body, and said header body having a pair of integrally formed ears each extending outwardly from said cylindrical body at a respective circumferential location thereon.

16. The invention as in claim 15 in which said ears extend from the cylindrical body in opposite horizontal directions.

17. A spraying system comprising a tubular header having a generally cylindrical body which defines an internal bore through which liquid is directed, said cylindrical body having at least one integrally formed enlarged wall section for reinforcing the body and for defining an external relatively flat, longitudinally extending nozzle mounting surface parallel to the axis of said cylindrical bore, said body being formed with a plurality of longitudinally spaced transverse passageways extending through said flat mounting surface, and a plurality of nozzles connected to said flat mounting surface and each having a liquid passageway communicating with a respective one of said transverse passageways and said cylindrical bore for spraying liquid directed through said internal header bore.

18. The invention as in claim 17 including a header support, and said header body being formed with integrally formed engagement members for enabling said header to be suspended from said support.

19. The invention as in claim 17 in which said header body has a plurality of said enlarged wall portions each defining a substantially flat nozzle mounting surface formed with a plurality of transverse fluid passageways.

20. The invention as in claim 17 wherein the header includes a pair of enlarged wall sections for defining respective flat nozzle mounting surfaces on opposite sides of said header.

21. The invention as in 20 wherein said flat surfaces are spaced apart about 180 degrees from each other.

22. The invention as in claim 17 wherein the horizontal support comprises spaced pairs of opposed flanges each pair of which defines a longitudinal groove for receiving a respective one of said engagement members.

23. The invention as in claim 17 wherein the header body defines a female connection at an end thereof adapted to be received by another component of the spraying system.

24. The invention as in claim 17 wherein each nozzle includes a downwardly oriented nozzle body connected to the planar surface of said header body and being formed with a passageway communicating with a transverse passageway of said header body, and a nozzle tip connected to said nozzle body.

* * * * *